(12) United States Patent
Pavetic

(10) Patent No.: US 10,061,987 B2
(45) Date of Patent: Aug. 28, 2018

(54) DIFFERENTIAL SCORING: A HIGH-PRECISION SCORING METHOD FOR VIDEO MATCHING

(71) Applicant: Google Inc., Mountain View, CA (US)

(72) Inventor: Filip Pavetic, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 28 days.

(21) Appl. No.: 15/349,882

(22) Filed: Nov. 11, 2016

(65) Prior Publication Data

US 2018/0137367 A1    May 17, 2018

(51) Int. Cl.
*G06K 9/68* (2006.01)
*G06K 9/00* (2006.01)
*G06K 9/62* (2006.01)
*G06F 17/30* (2006.01)

(52) U.S. Cl.
CPC ..... *G06K 9/00758* (2013.01); *G06F 17/3082* (2013.01); *G06F 17/30784* (2013.01); *G06K 9/00744* (2013.01); *G06K 9/00765* (2013.01); *G06K 9/6215* (2013.01)

(58) Field of Classification Search
CPC .......... G06K 9/00744; G06K 9/00208; G06K 9/00765; H04N 21/44008; H04N 5/913
See application file for complete search history.

(56) References Cited

U.S. PATENT DOCUMENTS

| | | | |
|---|---|---|---|
| 8,094,872 B1 | 1/2012 | Yagnik et al. | |
| 8,611,422 B1 | 12/2013 | Yagnik et al. | |
| 8,712,216 B1 * | 4/2014 | Covell | G11B 27/28 382/100 |
| 2007/0268966 A1 * | 11/2007 | Kim | G06F 17/30814 375/240.08 |
| 2009/0052784 A1 * | 2/2009 | Covell | G06F 17/30784 382/209 |
| 2009/0328125 A1 * | 12/2009 | Gits | G06F 17/3079 725/118 |
| 2016/0210716 A1 | 7/2016 | Ghosh et al. | |

OTHER PUBLICATIONS

International Search Report and Written Opinion of the International Searching Authority for International Application PCT/US2017/050580 dated Nov. 6, 2017; pp. 1-14.

* cited by examiner

*Primary Examiner* — Eueng-Nan Yeh
(74) *Attorney, Agent, or Firm* — Young Basile Hanlon & MacFarlane, P.C.

(57) ABSTRACT

Whether a not a given video includes video content of other videos is determined by evaluating video content as well as video content transitions over time of videos. One or more fingerprints of the video are created and used to match against reference fingerprints of reference videos to identify candidate videos that is likely to have matching video content as an input video. After a candidate video is identified, a likelihood of the candidate video and an input video having matching video content is evaluated. A confidence score based on the evaluation of video content as well as video content transitions over time for a pair of videos including the input video and a candidate video is generated. When the confidence score exceeds a threshold score, it is determined that the pair of videos is likely to include the matching video content.

20 Claims, 5 Drawing Sheets

DIFFERENTIAL SCORING: A HIGH-PRECISION SCORING METHOD FOR VIDEO MATCHING

BACKGROUND

1. Field of Art

The invention generally relates to video processing, and more specifically to video content matching.

2. Description of the Related Art

Online systems store, index, and make available for consumption various forms of media content to Internet users. This content may take a variety of forms; in particular, video content, including streaming video is widely available across the Internet. Online video systems allow users to view videos uploaded by other users. Popular online content systems for videos include YouTube™. These online video systems may contain thousands or millions of video files, making management of these video files an extremely challenging task. As such, online video systems need a mechanism for identifying uploaded videos that include visually-identical or similar content.

While some files may be identified by file name or other information provided by the user, this identification information may be incorrect or insufficient to correctly identify the video. An alternate approach of using humans to manually identifying video content is expensive and time consuming. Various methods have been used to automatically detect similarities between video files based on their video content. In the past, various identification techniques (such as an MD5 hash on the video file) have been used to identify exact copies of video files. Generally, a digital "fingerprint" is generated by applying a hash-based fingerprint function to a bit sequence of the video file; this generates a fixed-length monolithic bit pattern—the fingerprint—that uniquely identifies the file based on the input bit sequence. Then, fingerprints for files are compared in order to detect exact bit-for-bit matches between files. However, this approach is not tolerant of slight deviations between files and produces false negative results.

Approaches that are more tolerant of slight deviations between files often produce false positive identifications. A video is likely to be misidentified when its content is almost the same as another video but includes distinguishing content in small areas. Sports are good examples. For instance, different basketball games played by the same two teams are likely to be identified to include the same content because they present highly similar visual content. Accordingly, an improved technique is needed for precisely finding videos that have matching content and distinguishing videos based on the perceived visual content of the video.

SUMMARY

In one embodiment, a method receives an input video including video frames. The method divides the input video into a sequence of input video segments. Each input video segment includes at least one frame of the video that collectively are sequential within the input video. The method identifies a candidate video including a sequence of reference segment groups. Each reference segment group includes at least one reference video segment that collectively are sequential within the candidate video. Each reference segment group is determined to be similar to an input segment group including at least one input video segment that collectively are sequential within the input video. The method further evaluates the candidate video. The method determines a set of first similarity measures each indicating a degree of similarity between video content of the reference and input segment groups over a plurality of time intervals. The method determines a set of second similarity measures each indicating a degree of similarity between video content transitions of the reference and input segment groups over the time intervals. The method determines a likelihood of the input video and the candidate video including matching video content based on the first and second sets of similarity measures. Responsive to determining that the determined likelihood is greater than a threshold likelihood, the method determines that the input video and the candidate video are likely to include the matching video content. The method provides an indication that the input video and the candidate video are likely to include the matching video content.

In one embodiment, a system includes a computer processor and a non-transitory computer-readable storage medium storing computer executable components configured to cause the computer processor to perform the following steps. The system divides the input video into a sequence of input video segments. Each input video segment includes at least one frame of the video that collectively are sequential within the input video. The system identifies a candidate video including a sequence of reference segment groups. Each reference segment group includes at least one reference video segment that collectively are sequential within the candidate video. Each reference segment group is determined to be similar to an input segment group including at least one input video segment that collectively are sequential within the input video. The system further evaluates the candidate video. The system determines a set of first similarity measures each indicating a degree of similarity between video content of the reference and input segment groups over a plurality of time intervals. The system determines a set of second similarity measures each indicating a degree of similarity between video content transitions of the reference and input segment groups over the time intervals. The system determines a likelihood of the input video and the candidate video including matching video content based on the first and second sets of similarity measures. Responsive to determining that the determined likelihood is greater than a threshold likelihood, the system determines that the input video and the candidate video are likely to include the matching video content. The system provides an indication that the input video and the candidate video are likely to include the matching video content.

In one embodiment, a non-transitory computer-readable medium having instructions stored thereon that, in response to execution, cause a system including a processor to perform the following steps. The system divides the input video into a sequence of input video segments. Each input video segment includes at least one frame of the video that collectively are sequential within the input video. The system identifies a candidate video including a sequence of reference segment groups. Each reference segment group includes at least one reference video segment that collectively are sequential within the candidate video. Each reference segment group is determined to be similar to an input segment group including at least one input video segment that collectively are sequential within the input video. The system further evaluates the candidate video. The system determines a set of first similarity measures each indicating a degree of similarity between video content of the reference and input segment groups over a plurality of time intervals.

The system determines a set of second similarity measures each indicating a degree of similarity between video content transitions of the reference and input segment groups over the time intervals. The system determines a likelihood of the input video and the candidate video including matching video content based on the first and second sets of similarity measures. Responsive to determining that the determined likelihood is greater than a threshold likelihood, the system determines that the input video and the candidate video are likely to include the matching video content. The system provides an indication that the input video and the candidate video are likely to include the matching video content.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Architecture

Figure 1:
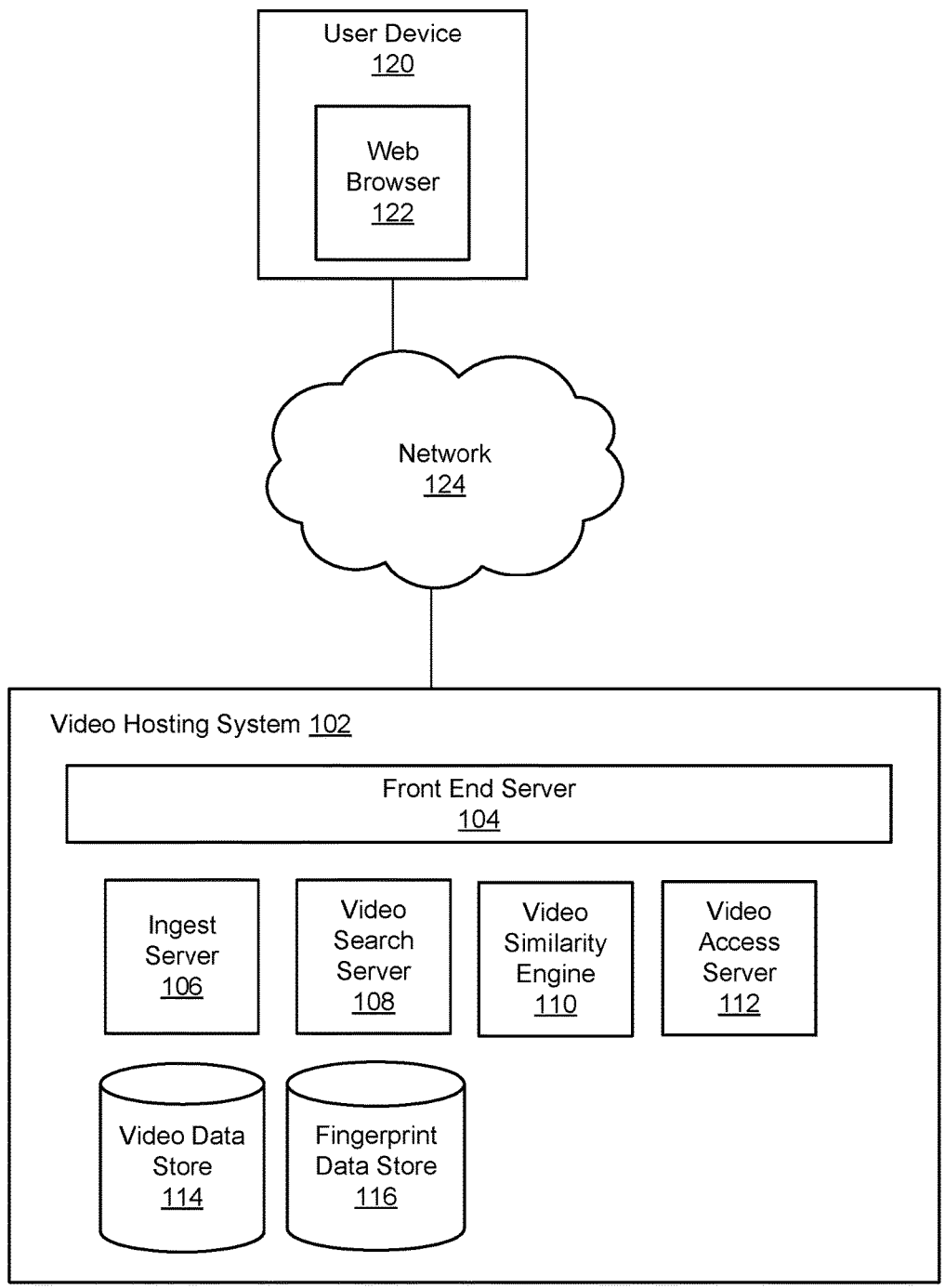
FIG. 1 is a high level block diagram of a system detecting similar or identical video content, according to one embodiment.

FIG. 1 is a high-level block diagram of a system for detecting similar or identical video content, according to one embodiment. FIG. 1 illustrates a video hosting system 102 and a user device 120 connected by a network 124. A client that is an individual or an entity can use the user device 120 to access videos contained within the video hosting system 102. Throughout this description, references to a client performing some action with respect to the system 102 generally assume that the client is performing such action using a user device 120, and it is the user device 120 that is communicating with the system 102. As initial examples, a client, through a user device 120, can access a video from the video hosting system 102 by browsing a catalog of videos, conducting searches using keywords, reviewing play lists from other clients or the system administrator (e.g., collections of videos forming channels), or viewing videos associated with particular client groups (e.g., communities). Additionally, in some embodiments, the video hosting system 102 is adapted to receive videos for storage in order to enable the sharing of the videos with other clients.

The user device 120 communicates with the video hosting system 102 over the network 124. In one embodiment, the user device 120 is a personal computer executing a web browser 122 such as GOOGLE CHROME that allows a client to view web pages and videos provided by the video hosting system 102. In another embodiment, the user device 120 is a mobile device such as a smartphone or tablet computer, or even a personal computer, that executes a software application ("app") providing specific functionality for accessing the video hosting system 102. The user device 120 may also be another network-capable device such as a car entertainment system, television "set-top box," etc. Although FIG. 1 illustrates only a single user device 120, it should be understood that many user devices (e.g., millions) can communicate with the video hosting system 102 at any time. Only one user device 120 is illustrated in order to simplify and clarify the present description.

The network 124 represents the communication pathways between the user device 120 and the video hosting system 102. In one embodiment, the network 124 is the Internet, but may also be any network, including but not limited to wired or wireless networks, cloud computing networks, private networks, virtual private networks, and any combination thereof. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

The video hosting system 102 allows clients to access video content via searching and/or browsing interfaces. The sources of videos can be from client uploads of videos, searches or crawls of other websites or databases of videos, or the like, or any combination thereof. For example, in one embodiment a video hosting system 102 can be configured to allow for client uploads of content; in another embodiment a video hosting system 102 can be configured to only obtain videos from other sources by crawling such sources or searching such sources in real time.

A suitable video hosting system 102 for implementation of the system is the YOUTUBE™ website. It will be understood that the term "website" represents any computer system adapted to serve content using any internetworking protocols, and is not intended to be limited to content uploaded or downloaded via the Internet or the HTTP protocol. In general, functions described in one embodiment as being performed on the server side can also be performed on the client side in other embodiments if appropriate. In addition, the functionality attributed to a particular component can be performed by different or multiple components operating together.

The video hosting system 102 comprises a front end server 104, an ingest server 106, a video search server 108, a video similarity engine 110, a video access server 112, a video data store 114, and a fingerprint data store 116. Many conventional features, such as firewalls, load balancers, application servers, failover servers, site management tools and so forth are not shown so as not to obscure the features of the system.

The front end server 104 handles all communication with the user device 120 via the network 124. The front end server 104 receives requests from the user device 120 and communicates with the other servers of the video hosting system 102 in order to process the requests. The front end server 104 is further configured to monitor client interactions with the video hosting system 102. For example, if a client clicks on a web page, uploads a video, views a video, makes a purchase, or fills a web-based form, the front end server 104 monitors these interactions. The front end server 104 may be further configured to transmit and present the requested video and related video links to the user device 120 on a webpage. The requested video is streamed by the front end server 104 to the user device 120. One or more related video links appear on the webpage where the requested video is playing, such that the related video link can be selected by a client in order to view the related videos.

Any content received via the network 124 from a user device 120 for posting to the video hosting system 102 is passed on to the ingest server 106 for processing. The processing of the video file includes assigning an identifier to the newly received video file. Other steps of processing the video file may include formatting (e.g., transcoding), compressing, metadata tagging, content analysis, and/or other data processing methods. In one embodiment, the user device 120 transmits a form along with the video file transmitted to the video hosting system 102. The client may include in the form information that describes the video (e.g., title, description, and tag information). The form information may also include an indication of the media type, which for uploaded videos would always be the "video" type. The ingest server 106 stores the processed video file in a video data store 114 and stores the information included in the form as metadata of the video file. The video data store 114 is the storage system where the video files transmitted to the video hosting system 102 are stored. A video may be accompanied by icons or thumbnail views, associated metadata, such as title, author, tags, description, comments, and rating. In various embodiments, the ingest server 106 may pass received videos directly to the video similarity engine 110 for analysis.

The video search server 108 processes clients' requests received by the front end server 104 and identifies videos that are relevant to the clients' requests. A client request provided by a client via the user device 120 to the front end server 104 may include a search query specifying one or more search terms. The video search server 108 may use the search term, for example, to query the metadata of all video files stored in the video data store 114. The search results are the videos of which the associated metadata is relevant to the search term. The search results from the query are transmitted to the front end server 104, so that the search results can be presented to the client.

The video access server 112 receives from the front end server 104 requests from clients that wish to view a specific video. From the client perspective, a client may submit a request for a video by browsing the different categories of the video hosting system 102 or by clicking on a link to a video from a search results webpage. The request transmitted by the user device 120 can include the identifier of the video the client wishes to view (which can be included automatically once the client clicks on the link for the video). The video access server 112 uses the identifier to search and locate where the video is stored in the video data store 114. The video access server 112 provides the video requested to the front end server 104.

The video similarity engine 110 determines if a given video, which may or may not be a recently uploaded video, and herein referred to as an "input video" for clarity, includes video content of one or more other videos, for example, from videos that are copyright protected, access restricted, or are otherwise noteworthy. If the input video is similar to an existing video, the video similarity engine 110 may flag, report, and/or remove the video from the video hosting system 102, depending upon whatever logic is added to the video similarity engine 110 to process such similar videos. The video similarity engine 110 can process a video simultaneously while it is being uploaded. The video similarity engine 110 can also process a video simultaneously when the ingest server 106 is processing the video.

To determine similarity, the video similarity engine 110 analyzes video content and video content transitions (e.g., transitions between shots) of an input video. To do this, the video similarity engine 110 creates one or more fingerprints of an input video. The fingerprints may be generated based on individual video frames of the video. The video similarity engine 110 may divide consecutive video frames into shots by detecting temporal locations of discontinuities in video content of the input video by comparing fingerprints of consecutive frames. For example, a temporal location of discontinuity is detected when a distance between fingerprints of two consecutive frames is beyond a threshold distance. The video similarity engine 110 matches the fingerprints of the input video against reference fingerprints of reference videos to identify candidate reference videos of which the content is likely to be included in the video. After a candidate reference video is identified, the video similarity engine 110 evaluates a likelihood of the candidate reference video and an input video having matching video content. The video similarity engine 110 generates a confidence score based on the evaluation of video content and video content transitions over time for a pair of videos including the input video and a candidate reference video. When the confidence score exceeds a threshold score, the video similarity engine 110 determines that video content of the pair of videos is likely to match.

The fingerprint data store 116 stores fingerprints derived from a video corresponding to a video file stored in the video data store 114. Fingerprints stored in the fingerprint data store 116 can be used as reference for the video similarity engine 110 to determine whether a video includes video content of one or more other videos.

It should be appreciated that the data processing operations of the video similarity engine 110, as described herein, inherently require a programmed computer system for their practical implementation. To simplify and clarify the present description, the content received and shared by the video hosting system 102 is generally referred to as videos, video files, or video items, as appropriate for the video-specific embodiments described herein, but it should be understood that the video hosting system 102 can receive and share content of any media type that includes pictures of moving content such as 360 degree videos, 3D videos, etc., virtual or augmented reality content, etc.

Video Similarity Engine

Figure 2:
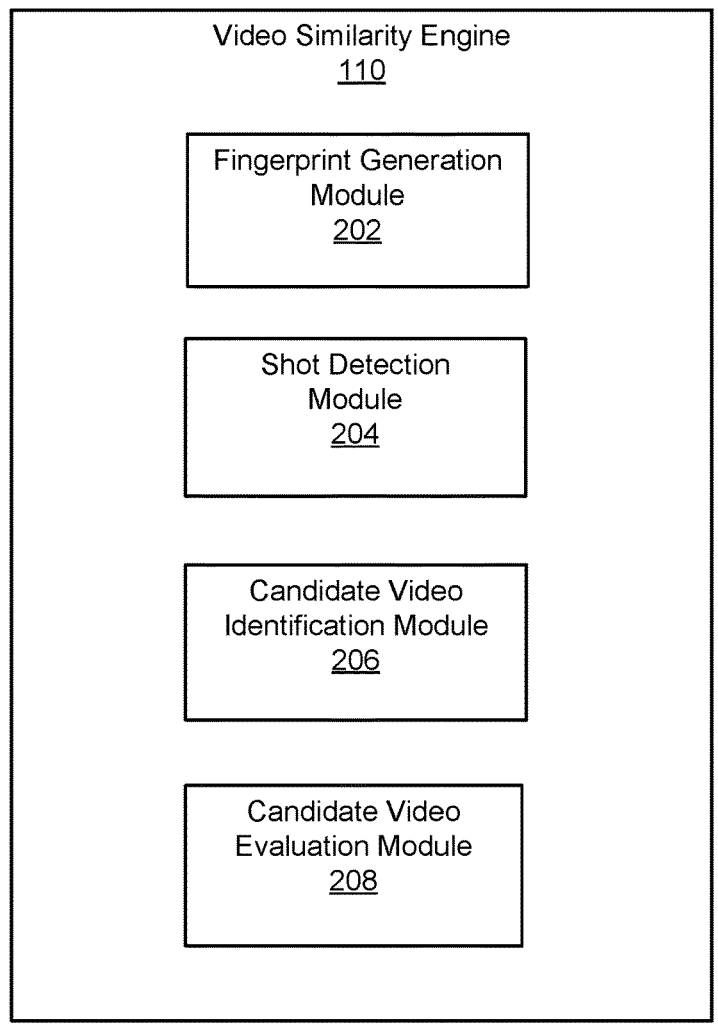
FIG. 2 is a high-level block diagram illustrating a detailed view of the video similarity engine, according to one embodiment.

FIG. 2 is a high-level block diagram illustrating a detailed view of the video similarity engine 110, according to one embodiment. As shown in FIG. 2, the video similarity engine 110 includes several modules. Those of skill in the art will recognize that other embodiments can have different modules than the ones described here, and that the functionalities can be distributed among the modules in a different manner. In addition, the functions ascribed to the video similarity engine 110 can be performed by multiple engines. As illustrated, the video similarity engine 110 includes a fingerprint generation module 202, a shot detection module 204, a candidate video identification module 206, and a candidate video evaluation module 208.

Figure 3A:
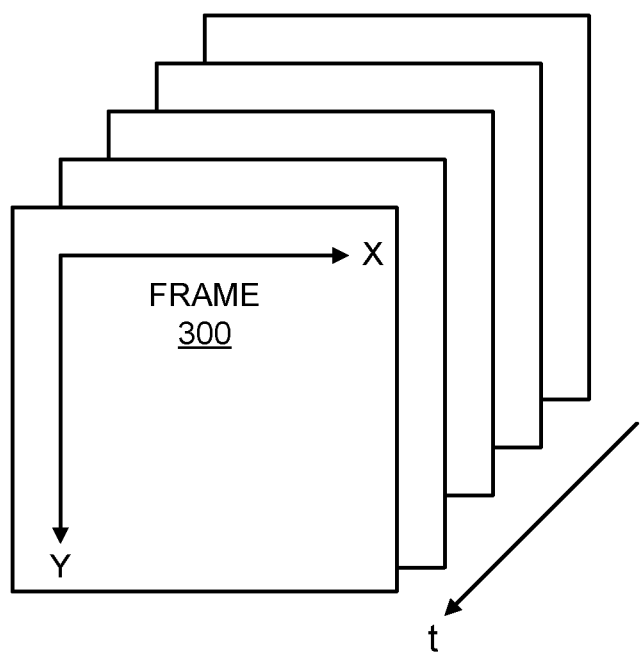
FIG. 3A illustrates an example structure for a video received by a video similarity engine, according to one embodiment.

An example structure for an input video received by the video similarity engine 110 is provided in FIG. 3A. The input video comprises a series of video frames 300. Each video frame 300 comprises an image having a plurality of pixels arranged in a two-dimensional grid (for example, in an X direction and a Y direction). The series of video frames 300 are also arranged sequentially in time (the t direction). Accordingly, an input video comprises both spatial information, defined by the arrangement of pixels in the X and Y directions, and sequential or temporal information defined by how the pixels change throughout the time (t) dimension.

Fingerprint Generation Module

The fingerprint generation module 202 generates fingerprints for an input video using individual video frames. Fingerprints can represent image content of a video frame of an input video. As an example, a fingerprint may be implemented as a float vector representing, for example, unique characteristics of a frame such as color, spatial, temporal, and/or structural characteristics. The fingerprint identifies the frame based on its visual content such that minor variations due to compression, de-compression, noise, start and stop time, source resolutions and the like do not significantly affect the fingerprint. The fingerprint generation module 204 may normalize the fingerprints generated for the input video.

The fingerprint generation module 202 may receive an input video from the ingest server 104 or from the video data store 114. In some embodiments, the fingerprint generation module 202 generates fingerprints for an input video simultaneously when the ingest sever 104 processes the input video.

Shot Detection Module

The shot detection module 204 organizes sequences of consecutive video frames into shots to serve as a baseline upon which candidate reference videos are identified. Each shot of an input video segment includes consecutive video frames. The shot detection module 204 analyzes the characteristics of the consecutive video frames to determine temporal locations of discontinuities in video content of the input video. A discontinuity can be, for example, a scene transition, an abrupt change such as when a video scene switches from one camera angle to another (i.e. a cut), a fade in which the shot slowly fades to black and a new shot begins, a dissolve in which a first shot slowly transitions into a second shot, or any other type of transition. In some embodiments, the shot detection module 204 compares fingerprints of consecutive video frames to detect discontinuities in each pair of consecutive video frames. For example, a similarity measure (e.g., a dot product) between fingerprints may be calculated and compared to a threshold similarity measure (e.g., a threshold dot product). When the similarity measure between a pair of fingerprints is less than a threshold similarity measure, a discontinuity is identified. The shot detection module 204 divides the consecutive video frames of the input video into a set of shots based on the presence of these continuities between pairs or sets of consecutive video frames. The shot detection module 204 may further generate a shot fingerprint representing a shot by averaging the fingerprints of the consecutive frames included in the shot. A shot fingerprint can be a median, a mean, or other values determined from the fingerprints of the frames included in the shot. Additionally or alternatively, fingerprints may be centered around their means, respectively, to remove the common background. Significance of the remaining features is then re-weighted. The video along with the detected shots of video frames, fingerprints, and shot fingerprints are provided to the candidate identification module 206 for identification of candidate reference videos.

Candidate Video Identification Module

The candidate video identification module 206 identifies a set of candidate reference videos for an input video using the shot fingerprints created for the input video. Once a video is determined to be a candidate video, at least some of the video content of an identified candidate reference video and an input video has been determined to be similar. For clarity purposes, candidate reference videos identified for an input video are hereinafter referred to simply as candidate videos. The candidate video identification module 206 matches the input shot fingerprints generated for the input video against reference shot fingerprints generated for reference videos that are stored in the fingerprint data store 116 to identify candidate videos. For example, input shot fingerprints of shots of an input video (hereinafter "probe shots") are matched against reference shot fingerprints of shots of references videos (hereinafter "reference shots.") When a pair of shot fingerprints is determined to match, the video content of the input shot and the reference shot is likely to match. Matching between a pair of fingerprints is determined by calculating a similarity measure between the fingerprints and comparing the calculated similarity measure to a threshold similarity measure. For example, in one embodiment, a dot product representing a distance between the fingerprints is calculated. When the dot product is greater than a threshold value indicating that the distance between the fingerprints is less than a threshold distance, the pair of fingerprints is determined to match.

The candidate video identification module 206 allows fingerprints of different lengths to be compared and matched against each other. This is because video content of different playback speeds can be identical in the rest of the video characteristics. For example, an original video and another video that is a 1.5× playback speed version of the video are considered to present the same video content. In some embodiments, the candidate video identification module 206 requires that a playback speed of a candidate reference video is at least half of or at most twice a playback speed of the input video. The playback speed of a reference shot that can match a probe shot is at least half of or at most twice the playback speed of a probe shot. Accordingly, for a pair of fingerprints that can be determined to match, the shorter fingerprint is at least half of the longer fingerprint in length. For the purpose of discussion here, when identifying candidate videos for an input video, the playback speed of a reference video is adjusted according to the playback speed of the input video.

The candidate identification module 206 identifies a given reference video as a candidate video for the input video when sequences of probe shots of the input video are determined to likely match sequences of reference shots of the reference video. More specifically, a group of input shot fingerprints representing a group of consecutive probe shots can be matched against a group of reference shot fingerprints representing a group of consecutive reference shots. As described herein, a group of fingerprints includes at least one fingerprint and a group of consecutive shots includes at least one shot that collectively are sequential. This is to take into consideration of differences in shot creations. For example, a pair of videos having the same video content may be divided into shots at different temporal locations such that individual shots include completely different video content and there is no matching between individual fingerprints of the two videos. Nevertheless, on a group level, consecutive shots include matching video content.

When matching fingerprints of an input video to fingerprints of reference videos to identify candidate videos for the input video, the candidate identification module 206 compares sequences of shot fingerprints for the input video and for a given reference video over time intervals to determine whether a particular reference video can be identified as a candidate video for the input video. For the input video and an identified candidate video pair (assuming the playback speed of the candidate video has been adjusted), sequences of shot fingerprints for the input video and the identified candidate video are assumed, for purposes of this analysis, to share similar trajectories in a fingerprint space. In the fingerprint space, a video can be represented by a "line" including "line segments" (e.g., fingerprints) representing shots of the video. In the fingerprint space, the lines representing the input video and an identified candidate video share similar trajectories.

The candidate video identification module 206 examines a similarity between the trajectories of the line segments included in the two lines progressing over time in a fingerprint space. In one embodiment, when identifying a candidate reference video for an input video, the candidate video identification module 206 calculates and updates a confidence score every time a match between groups of fingerprints representing sequences of shots between a reference video and the input video is identified. The confidence scores determined for an identified candidate video should increase over time. An example of illustrating identifying and evaluating candidate reference videos for a video is provided with respect to FIG. 3B as further described below.

The candidate video identification module 206 outputs candidate videos each represented by a sequence of reference group fingerprints for further evaluation by the candidate video evaluation module 208. Along with each candidate video represented by a sequence of reference group fingerprints, the candidate video identification module 206 provides a sequence of matching input group fingerprints representing the input video.

When a reference group fingerprint and an input group fingerprint are determined to match, a group of consecutive reference shots ("a reference shot group") represented by the reference group fingerprint and a group of consecutive probe shots ("a probe shot group") represented by the input group fingerprint are likely to have matching video content. A group fingerprint representing video content of a group of consecutive shots is an average of the shot fingerprints of the shots included in the group.

As one example, the candidate video identification module 206 provides, to the candidate video evaluation module 208 for further analysis, two sequences of group fingerprints: $P_1, P_2, \ldots P_i, \ldots P_n$ and $R_1, R_2, \ldots R_i, \ldots R_n$ representing the input video (or a segment of the input video) and an identified candidate video (or a segment of the identified candidate video), respectively. An input group fingerprint $P_i$ represents a probe shot group of the input video and is determined to match a reference group fingerprint $R_i$ representing a reference shot group of the candidate video. The candidate video identification module 206 can provide multiple pairs of sequences of group fingerprints representing different segments of the input video and corresponding segments of the reference video. Within the sequence of reference group fingerprints, a reference shot group of the candidate video is adjusted to be temporally aligned to the corresponding probe shot group of the input video. For example, a length of a reference group fingerprint is adjusted to equal to the length of the matching input group fingerprint.

Candidate Video Evaluation Module

The candidate video evaluation module 208 evaluates each identified candidate video to determine whether the candidate video (or a segment thereof) and the input video (or a segment thereof) include video content that is likely to match. In other words, the candidate video evaluation module 208 removes candidate videos identified by the candidate reference video 206 that are not likely to include matching video content as the input video. The candidate video evaluation module 208 evaluates a likelihood of each identified candidate video and the input video (or segments thereof) including matching video content by evaluating a degree of similarity between video content of the input video and each identified candidate video. The degree of similarity is determined by evaluating video content and video content transitions of both videos over time using the sequences of group fingerprints outputted by the candidate video identification module 206. When the determined likelihood for a particular candidate video exceeds a threshold likelihood, the candidate video evaluation module 208 determines that the input video and the candidate video (or segments thereof) are likely to include matching video content.

The candidate video evaluation module 208 evaluates the video content and video content transitions in time intervals (sometimes predetermined) of the input video. In one embodiment, since the input video and the reference video have been temporally aligned, each predetermined time interval includes a predetermined number of frames and is twice the duration of a temporal region H for evaluating video content transitions.

Within each predetermined time interval, the candidate video evaluation module 208 calculates, for that time interval, a degree of similarity between group fingerprints representing reference and probe shot groups included in the time interval. Within each predetermined time interval, for that time interval, the candidate video evaluation module 208 further calculates a degree of similarity between differences between group fingerprints representing reference and probe shot groups included in the time interval. A probe shot group included in a time interval has a starting time point (e.g., a corresponding frame number) within the time interval (e.g., a number of frames) and the corresponding reference shot group is determined to be included in the time interval. The candidate video evaluation module 208 evaluates similarities at every time point (i.e., frame) of the predetermined time interval.

In each predetermined time interval, a predetermined temporal region that includes a predetermined number of frames is used for evaluating motion of the video content over time. In this implementation, the candidate video evaluation module 208 calculates one or more first similarity measures to evaluate the degree of similarity between video content of a pair of videos. One or more second similarity measures are also calculated to evaluate degrees of similarity between video content transitions. That is, the second similarity measures a degree of similarity between a pair of videos when transitioning from one group of shots to another. To give a sense of timescales, the predetermined time interval is longer and includes more frames than the predetermined temporal region, for example twice (or some other real-number multiple) the duration of the predetermined temporal region.

For an input video and a candidate video pair, at a particular time corresponding to a particular frame x, the candidate video evaluation module 208 calculates a confidence score $S_x$ indicating a likelihood of the pair of videos having matching video content during a time interval of (x−H) to (x+H), according to Equation (1):

$$S_x = 1 + \frac{1}{H^2} \sum_{i=x-H}^{x} \sum_{j=x}^{x+H} \log$$ (1)

$(\max(0.01, \min\{(P_i \cdot R_i), (P_j \cdot R_j), ((P_i - P_j) \cdot (R_i - R_j))\})$, where H is a predetermined temporal region for evaluating transitions of video content, $P_i$ is an input group fingerprint that has a starting time between the time interval of (x−H) to x, $P_j$ is an input group fingerprint that has a starting time between the time interval of x to (x+H), $R_i$ is a reference group fingerprint corresponding to $P_i$, and $R_j$ is a reference group fingerprint corresponding to $P_j$. The dot product of two fingerprints (i.e., the similarity measure) represents a distance between the two fingerprints and indicates a similarity between the two fingerprints.

The confidence score $S_x$ as calculated by Equation (1) represents, during the time interval (x−H) to (x+H), a likelihood determined based on a first similarity measure between video content (e.g., as represented by ($P_i \cdot R_i$) and ($P_j \cdot R_j$) terms of Equation (1)) and a second similarity measure between video content transitions between groups of shots (e.g., as represented by the (($P_i - P_j) \cdot (R_i - R_j$)) terms in Equation (1)). The confidence score $S_x$ is generally a value in the range of [−1, 1], but may be otherwise normalized (or not). According to an implementation such as Equation (1), a higher value indicates the video content of the video pair is more likely to match at the time point x.

The candidate video evaluation module 208 determines a confidence score S indicating a likelihood of an input video-candidate video pair having matching video content as a sum of all confidence scores $S_x$ calculated for every frames x included in the input video (or a segment thereof). The candidate video evaluation module 208 compares the confidence score S determined for a candidate video to a threshold confidence score. When S is at least the same as the threshold confidence score, the candidate video evaluation module 208 determines the candidate video and the input video are likely to have matching video content.

Figure 3B:
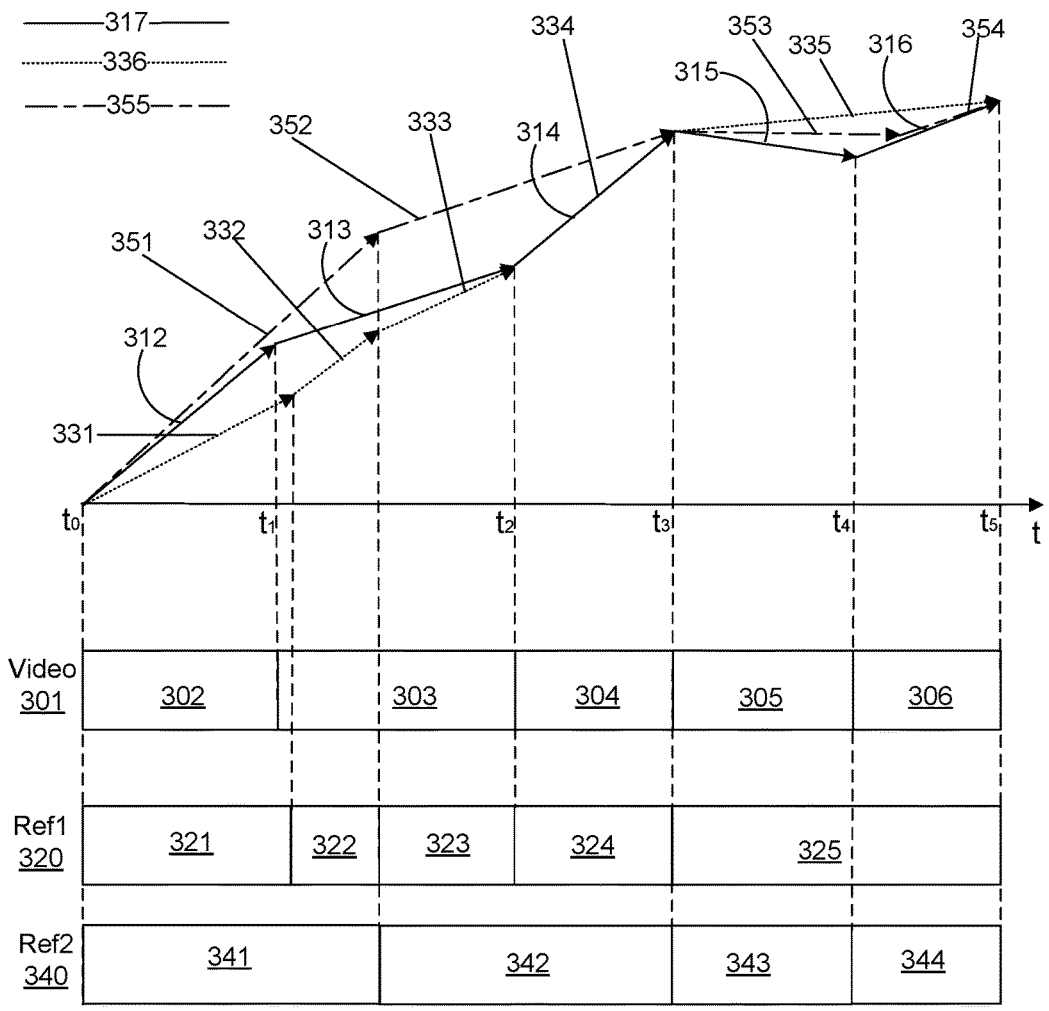
FIG. 3B illustrates identifying and evaluating candidate reference videos for an input video, according to one embodiment.

FIG. 3B illustrates an example of identifying and evaluating candidate reference videos for an input video, according to one embodiment. An input video 301 is divided into probe shots 302-306 represented by shot fingerprints 312-316 generated for the video 301, respectively. In a feature space, the video 301 can be represented by the line 317 that includes line segments 312-316. The reference videos 320 and 340 are identified by matching the shot fingerprints 312-316 against reference shot fingerprints generated for reference videos.

The reference video 320 is identified as a candidate video for the video 301. For example, a group of shot fingerprints 312-313 is determined to match a group of shot fingerprints 331-333 representing the reference shots 321-323 of the reference video 320 and a first likelihood indicating the videos 301 and 320 matching is calculated using a degree of similarity between the groups of shot fingerprints 312-313 and 331-333. The shot fingerprint 314 is determined to match the shot fingerprint 334 representing the reference shot 324 of the reference video 320 and a second likelihood indicating the videos 301 and 320 matching is calculated using the first likelihood and a degree of similarity between the fingerprints 314 and 334. A group of shot fingerprints 315-316 is determined to match the shot fingerprint 335 representing the reference shot 325 of the reference video 320 and a third likelihood indicating the videos 301 and 320 matching is calculated using the second likelihood and a degree of similarity between the shot fingerprints 315-316 and 335. The third likelihood is greater than the second likelihood which is greater than the first likelihood.

The reference video 340 is identified as another candidate video for the video 301. A group of shot fingerprints 312-314 is determined to match a group of shot fingerprints 351-352 representing the reference shots 341-342 of the reference video 340 and a fourth likelihood of the videos 301 and 340 matching is calculated using a degree of similarity between the groups of shot fingerprints 312-314 and 351-352. A group of shot fingerprints 315-316 is determined to match a group of shot fingerprints 343-344 representing the shots 353-354 of the reference video 340 and a fifth likelihood of the videos 301 and 340 matching is calculated using a degree of similarity between the groups of shot fingerprints 315-316 and 343-344. The fifth likelihood is greater than the fourth likelihood.

For the pair of videos 301 and 320, the sequences of probe shots 302-303, 304, and 305-306 are determined to match or likely to match the sequences of reference shots 321-323, 324, and 325, respectively. For the pair of videos 301 and 340, the sequences of shots 302-304 and 305-306 are determined to match or likely to match the sequences of shots 341-342 and 343-344, respectively. A pair of sequences of group fingerprints $P_1$ (representing a group of probe shots 302-303), $P_2$ (representing a probe shot 304), $P_3$ (representing a group of probe shots 305-306) and $R_3$ (representing a group of reference shots 321-323), $R_2$ (representing a reference shot 324), $R_3$ (representing a reference shot 325) is provided by the candidate video identification module 206 to the candidate video evaluation module 208 for further analysis. Another pair of sequences of group fingerprints $P_1'$ (representing a group of probe shots 302-304), $P_2'$ (representing a group of probe shots 305-306) and $R_1'$ (representing a group of reference shots 341-342), $R_2'$ (representing a group of reference shots 343-344) is also provided by the candidate video identification module 206 to the candidate video evaluation module 208 for further analysis. Each group fingerprint representing a group of shots and is an average of the shot fingerprints for the consecutive shots included in the group. For example, $P_1$ is an average of shot fingerprints 312 and 313 and $P_1'$ is an average of shot fingerprints 312, 313, and 314.

The video similarity engine 110 further calculates a confidence score for each video pair (i.e., the videos 301 and 320, the videos 301 and 340) to evaluate whether or not it is a false positive. For the pair of videos 301 and 320, the confidence score is calculated using the sequences of group fingerprints $P_1, P_2, P_3$ and $R_1, R_2, R_3$. For the pair of videos 301 and 340, the confidence score is calculated using the sequences of group fingerprints $P_1', P_2'$ and $R_1', R_2'$. The confidence scores are calculated according to Equation (1).

Process of Detecting Whether a Video Includes Video Content of Other Videos

Figure 4:
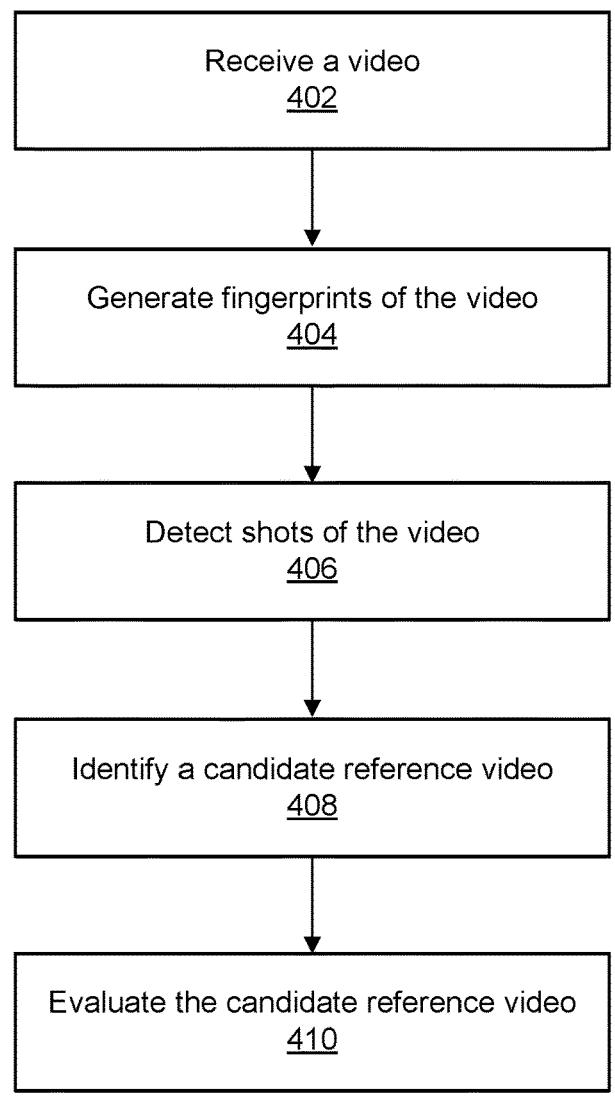
FIG. 4 illustrates a flow chart of an example process of detecting whether a video includes video content of other videos, according to one embodiment.

FIG. 4 illustrates a flow chart of an example process of detecting whether a video includes video content of other videos, according to one embodiment. The video hosting system 102 receives 402 a video. The video hosting system 120 generates 404 fingerprints for the video using video frames. The video hosting system 120 organizes 406 sequences of consecutive video frames into shots, for example, by detecting temporal locations of discontinuity. Each shot includes consecutive video frames and can be represented by a shot fingerprint that is an average of fingerprints of the consecutive frames included in the shot.

The video hosting system 120 identifies 408 a candidate video of which the video content is similar or identical to that of the input video. The candidate reference video may be identified by matching the input shot fingerprints of the input video to reference fingerprints stored in the fingerprint data store 116. A similarity measure (e.g., a dot product) between a pair of fingerprints can be calculated and compared to a threshold similarity measure. When the determined similarity measure is greater than a threshold similarity measure, the fingerprints are determined to match and the video content represented by the shot fingerprints is likely to match. When identifying whether a reference video is a candidate video for an input video, a group of input shot fingerprints representing a group of consecutive shots of the input video can be matched against a group of reference shot fingerprints representing a group of consecutive shots of the reference video. An identified candidate video includes at least one sequence of video segments of which the video content is likely to match the video content of the at least one sequence of video segments of the input video. When a candidate reference video is identified, a pair of sequences of group fingerprints representing the candidate reference video (or a segment thereof) and the input video (or a segment thereof) is used for further analysis. Each group fingerprint represents a group of shots and is an average of shot fingerprints representing the shots included in the group. Each reference group fingerprint from a sequence representing a candidate video is determined to match a corresponding input group fingerprint from the other sequence representing the input video.

The video hosting system 120 evaluates 410 the candidate video to determine whether an identified candidate reference video and an input video are likely to have matching video content. The video hosting system 120 determines a likelihood of a candidate video and the input video having matching video content by evaluating a similarity between video content of the videos. The video hosting system 120 may calculate one or more similarity measures by using the pair of sequences of group fingerprints to evaluate degrees of the similarity between video content. The video hosting system 120 calculates a confidence score indicating the likelihood of the candidate video and the input video including matching video content by using the determined similarity measures. The video hosting system 120 evaluates video content of an input video and a candidate video by evaluating video content as well as video content transitions in predetermined time intervals of an input video. Within each predetermined time interval, the candidate video evaluation module 208 calculates, for that time interval, one or more first similarity measures between group fingerprints representing probe and reference shot groups included in the time interval. Within each predetermined time interval, the candidate video evaluation module 208 further calculates, for that time interval, one or more second similarity measures between differences between group fingerprints representing probe and reference shot groups included in the time interval.

In one implementation, a predetermined time interval is twice the duration of a temporal region for evaluating motions. In each predetermined time interval, at least two first similarity measures are calculated. One of the first similarity measure is calculated by using group fingerprints representing a probe shot group having a first starting time within the first half of the time interval and the corresponding reference shot group, and the other one is calculated by using group fingerprints representing a probe group having a second starting time within the second half of the time interval and the corresponding reference shot group.

In one implementation, for a time interval, a confidence score may be calculated according to Equation (1). The video hosting system 120 sums up all confidence scores calculated for different time intervals to determine an overall confidence score for the candidate reference video. The overall confidence score is compared to a threshold score. If the overall confidence score for the candidate reference video is at least the threshold score, the video hosting system 120 determines that the candidate video and the input video are likely to have matching content. That is, the candidate video is not a false positive.

Additional Considerations

Some portions of the above description present the feature of the present invention in terms of algorithms and symbolic representations of operations on information. These algorithmic descriptions and representations are the means used by those skilled in the arts to most effectively convey the substance of their work to others skilled in the art. These operations, while described functionally or logically, are understood to be implemented by computer programs. Furthermore, it has also proven convenient at times, to refer to these arrangements of operations as modules or code devices, without loss of generality.

It should be borne in mind, however, that all of these and similar terms are to be associated with the appropriate physical quantities and are merely convenient labels applied to these quantities. Unless specifically stated otherwise as apparent from the present discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

What is claimed is:

1. A method, comprising:
   receiving an input video including video frames;
   dividing the input video into a sequence of input video segments, each input video segment including at least one frame of the input video that collectively are sequential within the input video;
   identifying a candidate video including a sequence of reference segment groups,
      each reference segment group including at least one reference video segment that collectively are sequential within the candidate video,
      each reference segment group determined to be similar to an input segment group including at least one input video segment that collectively are sequential within the input video,
         the each reference segment group represented by a first line of first line segments corresponding to trajectories of first fingerprints of the each reference segment group,
         the input segment group represented by a second line of second line segments corresponding to trajectories of second fingerprints of the input segment group, and
         the each reference segment group being determined to be similar to the input segment group based on a similarity of trajectories of the first line and the second line;
   evaluating the candidate video by:
      determining a set of first similarity measures each indicating a degree of similarity between video content of the reference and input segment groups over a plurality of time intervals;
      determining a set of second similarity measures each indicating a degree of similarity between video content transitions of the reference and input segment groups over the time intervals;
      determining a likelihood of the input video and the candidate video including matching video content based on the first set of similarity measures and the second set of similarity measures, the likelihood determined by steps comprising:
         determining one or more confidence scores, each confidence score determined using a respective first similarly measure of the set of first similarity measures and a respective second similarity measure of the set of second similarity measures; and
         determining the likelihood using a sum of the one or more confidence scores; and
      responsive to determining that the determined likelihood is greater than a threshold likelihood, determining that the input video and the candidate video are likely to include the matching video content; and
   responsive to determining that the input video and the candidate video are likely to include the matching video content, performing an action selected from a set of actions comprising:
      removing the input video from a website, and
      reporting the input video as matching the candidate video.

2. The method of claim 1, wherein the identifying the candidate video comprises:
   receiving a sequence of reference segment group fingerprints for the candidate video,
      each reference segment group fingerprint representing video content of a corresponding reference segment group of the reference segment groups.

3. The method of claim 2,
   wherein each reference segment group fingerprint is an average of reference shot fingerprints of the reference video segments included in the reference segment group, and
   wherein each reference segment group is temporally aligned to the corresponding input segment group.

4. The method of claim 1, further comprising:
   for each video segment: generating a shot fingerprint being an average of fingerprints of consecutive video frames of the video segment,
      wherein determining a first similarity measure comprises calculating a dot product between a reference segment group fingerprint representing video content of a reference video segment group and an input segment group fingerprint representing video content of the corresponding input video segment group.

5. The method of claim 1,
   wherein, in a time interval of the plurality of time intervals, at least two first similarity measures are calculated based on a first input segment group and a second input segment group,
   the first input segment group has a first starting time and the second input segment group has a second starting time within the input video, and
   the first starting time and the second starting time are within the time interval.

6. The method of claim 1, wherein the determining a second similarity measure comprises calculating a dot product between a first difference and a second difference,
   the first difference being between a first reference segment group fingerprint and a second reference segment group fingerprint and the second difference being between a first input segment group fingerprint and a second input segment group fingerprint,
   the first reference segment group fingerprint representing video content of a first reference segment group and the second reference segment group fingerprint representing video content of a second reference segment group, and
   the first input segment group fingerprint representing video content of a first input segment group corresponding to the first reference segment group and the second input segment group fingerprint representing video content of a second input segment group corresponding to the second reference segment group.

7. The method of claim 6, wherein the first input segment group has a first starting time point within a first half of a time interval of the plurality of time intervals, and the second input segment group has a second starting time within a second half of the time interval of the plurality of time intervals.

8. The method of claim 7, wherein the time interval is twice a duration of a temporal region, and the temporal region is a predetermined time duration for evaluating motions.

9. A system comprising:
a computer processor; and
a non-transitory computer-readable storage medium storing computer executable components configured to cause the computer processor to perform:
receiving an input video including video frames;
dividing the input video into a sequence of input video segments, each input video segment including at least one frame of the input video that collectively are sequential within the input video;
identifying a candidate video including a sequence of reference segment groups,
each reference segment group including at least one reference video segment that collectively are sequential within the candidate video,
each reference segment group determined to be similar to an input segment group including at least one input video segment that collectively are sequential within the input video,
one or more first fingerprints being associated with the each reference segment group,
one or more second fingerprints being associated with the input segment group, and
the each reference segment group being determined to be similar to the input segment group based on distances between the one or more first fingerprints and the one or more second fingerprints;
evaluating the candidate video by:
determining a set of first similarity measures each indicating a degree of similarity between video content of the reference and input segment groups over a plurality of time intervals;
determining a set of second similarity measures each indicating a degree of similarity between video content transitions of the reference and input segment groups over the time intervals;
determining a likelihood of the input video and the candidate video including matching video content based on the first set of similarity measures and the second set of similarity measures, the likelihood determined by steps comprising:
determining one or more confidence scores, each confidence score determined using a respective first similarly measure of the set of first similarity measures and a respective second similarity measure of the set of second similarity measures; and
determining the likelihood using a sum of the one or more confidence scores; and
responsive to determining that the determined likelihood is greater than a threshold likelihood, determining that the input video and the candidate video are likely to include the matching video content; and
responsive to determining that the input video and the candidate video are likely to include the matching video content, performing an action selected from a set of actions comprising:
removing the input video from a website, and
reporting the input video as matching the candidate video.

10. The system of claim 9, wherein the identifying the candidate video comprises:
receiving a sequence of reference segment group fingerprints for the candidate video,
each reference segment group fingerprint representing video content of a corresponding reference segment group of the reference segment groups.

11. The system of claim 10,
wherein each reference segment group fingerprint is an average of reference shot fingerprints of the reference video segments included in the reference segment group, and
wherein each reference segment group is temporally aligned to the corresponding input segment group.

12. The system of claim 9, wherein the computer executable components are further configured to cause the computer processor to perform:
for each video segment: generating a shot fingerprint being an average of fingerprints of consecutive video frames of the video segment,
wherein determining a first similarity measure comprises calculating a dot product between a reference segment group fingerprint representing video content of a reference video segment group and an input segment group fingerprint representing video content of the corresponding input video segment group.

13. The system of claim 9,
wherein, in a time interval of the plurality of time intervals, at least two first similarity measures are calculated based on a first input segment group and a second input segment group,
the first input segment group has a first starting time and the second input segment group has a second starting time within the input video, and
the first starting time and the second starting time are within the time interval.

14. The system of claim 9, wherein the determining a second similarity measure comprises:
calculating a dot product between a first difference and a second difference,
the first difference being between a first reference segment group fingerprint and a second reference segment group fingerprint and the second difference being between a first input segment group fingerprint and a second input segment group fingerprint,
the first reference segment group fingerprint representing video content of a first reference segment group and the second reference segment group fingerprint representing video content of a second reference segment group, and
the first input segment group fingerprint representing video content of a first input segment group corresponding to the first reference segment group and the second input segment group fingerprint representing video content of a second input segment group corresponding to the second reference segment group.

15. The system of claim 14, wherein the first input segment group has a first starting time point within a first half of a time interval of the plurality of time intervals, and the second input segment group has a second starting time within a second half of the time interval of the plurality of time intervals.

16. The system of claim 15, wherein the time interval is twice a duration of a temporal region, and the temporal region is a predetermined time duration for evaluating motions.

17. A non-transitory computer-readable medium having instructions stored thereon that, in response to execution, cause a system including a processor to perform steps comprising:
  receiving an input video including video frames;
  dividing the input video into a sequence of input video segments, each input video segment including at least one frame of the input video that collectively are sequential within the input video;
  identifying a candidate video including a sequence of reference segment groups,
    each reference segment group having first fingerprints and including at least one reference video segment that collectively are sequential within the candidate video,
    each reference segment group determined to be similar to an input segment group having second fingerprints and including at least one input video segment that collectively are sequential within the input video, and
    the each reference segment group being determined to be similar to the input segment group based a comparison of the first fingerprints to the second fingerprints;
  evaluating the candidate video by:
    determining a set of first similarity measures each indicating a degree of similarity between video content of the reference and input segment groups over a plurality of time intervals;
    determining a set of second similarity measures each indicating a degree of similarity between video content transitions of the reference and input segment groups over the time intervals;
    determining a likelihood of the input video and the candidate video including matching video content based on the first set of similarity measures and the second set of similarity measures; and
    responsive to determining that the determined likelihood is greater than a threshold likelihood, determining that the input video and the candidate video are likely to include the matching video content, the likelihood determined by steps comprising:
      determining one or more confidence scores, each confidence score determined using a respective first similarly measure of the set of first similarity measures and a respective second similarity measure of the set of second similarity measures; and
      determining the likelihood using a sum of the one or more confidence scores; and
  responsive to determining that the input video and the candidate video are likely to include the matching video content, performing an action selected from a set of actions comprising:
    removing the input video from a website, and
    reporting the input video as matching the candidate video.

18. The non-transitory computer-readable medium of claim 17, wherein the identifying the candidate video comprises:
  receiving a sequence of reference segment group fingerprints for the candidate video,
    each reference segment group fingerprint representing video content of a corresponding reference segment group of the reference segment groups.

19. The non-transitory computer-readable medium of claim 18,
  wherein each reference segment group fingerprint is an average of reference shot fingerprints of the reference video segments included in the reference segment group, and
  wherein each reference segment group is temporally aligned to the corresponding input segment group.

20. The non-transitory computer-readable medium of claim 17,
  wherein, in a time interval of the plurality of time intervals, at least two first similarity measures are calculated based on a first input segment group and a second input segment group,
  the first input segment group has a first starting time and the second input segment group has a second starting time within the input video, and
  the first starting time and the second starting time are within the time interval.

* * * * *